US010686277B2

(12) United States Patent
Leigh et al.

(10) Patent No.: US 10,686,277 B2
(45) Date of Patent: Jun. 16, 2020

(54) FEATURES TO CONJOIN ONE-LANE CABLE ASSEMBLIES

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/550,859

(22) PCT Filed: Feb. 27, 2015

(86) PCT No.: PCT/US2015/017970
§ 371 (c)(1),
(2) Date: Aug. 14, 2017

(87) PCT Pub. No.: WO2016/137486
PCT Pub. Date: Sep. 1, 2016

(65) Prior Publication Data
US 2018/0034191 A1    Feb. 1, 2018

(51) Int. Cl.
*H01R 13/514*    (2006.01)
*G02B 6/42*    (2006.01)
*G02B 6/38*    (2006.01)

(52) U.S. Cl.
CPC ......... *H01R 13/514* (2013.01); *G02B 6/3879* (2013.01); *G02B 6/4292* (2013.01); *G02B 6/3886* (2013.01)

(58) Field of Classification Search
CPC ... H01R 13/514; G02B 6/3879; G02B 6/4292
See application file for complete search history.

(56) References Cited

U.S. PATENT DOCUMENTS 3,656,086 A    4/1972  Debaigt
4,368,939 A *  1/1983  Foederer ............... H01R 24/76
                                              439/594

(Continued)

FOREIGN PATENT DOCUMENTS

EP    0831348 A2 *  3/1998  ........... G02B 6/3869
GB    2446494         8/2008

(Continued)

OTHER PUBLICATIONS

Search Report and Written Opinion received for PCT Application No. PCT/US2015/017970, dated Nov. 27, 2015, 10 pages.

*Primary Examiner* — Ryan A Lepisto
*Assistant Examiner* — Erin D Chiem
(74) *Attorney, Agent, or Firm* — Hewlett Packard Enterprise Patent Department

(57) ABSTRACT

One example of a cable assembly includes a plurality of 1-lane cable assemblies and latching features to couple the cable assembly to a receptacle. Each 1-lane cable assembly generally includes a cable and a cable connector attached to at least one end of the cable. As an example, surfaces of each cable connector of a 1-lane cable assembly generally includes features to conjoin with corresponding features on surfaces of cable connectors of other 1-lane cable assemblies. As an example, the conjoined features may secure the 1-lane cable assemblies to each other.

17 Claims, 10 Drawing Sheets

(56) References Cited

U.S. PATENT DOCUMENTS

| | | | |
|---|---|---|---|
| 4,469,393 A | 9/1984 | Chewning | |
| 5,386,487 A * | 1/1995 | Briggs | G02B 6/3879 385/59 |
| 5,611,010 A * | 3/1997 | Shiino | G02B 6/3879 29/750 |
| 6,120,332 A | 9/2000 | Bertens | |
| 6,267,514 B1 * | 7/2001 | Chen | G02B 6/3879 385/53 |
| 6,796,715 B2 | 9/2004 | Chiu | |
| 9,465,172 B2 * | 10/2016 | Shih | G02B 6/3879 |
| 2005/0118883 A1 | 6/2005 | Kim | |
| 2006/0261015 A1 | 11/2006 | Blackwell | |
| 2008/0311781 A1 | 12/2008 | Wojcik | |
| 2009/0011652 A1 | 1/2009 | Koh | |
| 2013/0167458 A1 * | 7/2013 | Cerny | E04F 15/02038 52/177 |
| 2013/0231011 A1 * | 9/2013 | Sytsma | H01R 9/034 439/723 |
| 2014/0322988 A1 | 10/2014 | Marshall | |
| 2015/0093922 A1 * | 4/2015 | Bosscher | H01R 13/665 439/39 |

FOREIGN PATENT DOCUMENTS

| | | |
|---|---|---|
| KR | 20-0239684 Y1 | 10/2001 |
| TW | 272260 B | 3/1996 |
| TW | 439289 B | 6/2001 |

* cited by examiner

FEATURES TO CONJOIN ONE-LANE CABLE ASSEMBLIES

BACKGROUND

High-radix network switch modules may support a high number of connectors on their faceplates. Network port standards allow 1-lane and wider ports (e.g., 12-lane for CXP), and wider ports use larger connectors and thus fewer connectors on the faceplate. Different applications use different port bandwidth. Traditionally, either 1-lane (e.g., Small Form-Factor Pluggable (SFP)) or 4-lane (e.g., Quad Small Form-Factor Pluggable (QSFP)) ports predominate the Ethernet industry. As the bandwidth available per lane has reached 10 Gbps and above, however, not every system can take advantage of QSFP 4-lane ports.

DETAILED DESCRIPTION

Figure 1A:
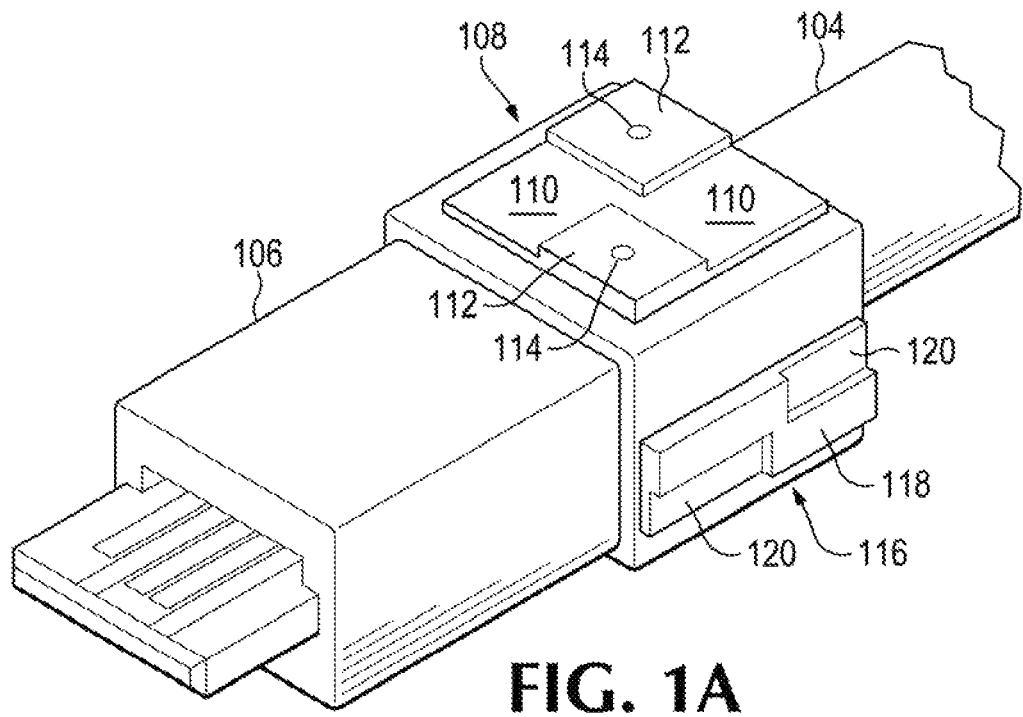
FIGS. 1A-C illustrate various isometric views of a cable connector of a 1-lane cable assembly, according to an example.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Traditional network ports have a fixed number of lanes. A lane includes a pair of transmit differential signals and a pair of receive differential signals for network communications. For example, there are multiple Ethernet standard protocols where 1 GbE and 10 GbE can be 1-lane protocols, 10 GbE, 40 GbE, and 100 GbE may be 4-lane protocols, and 100 GbE may be a 10-lane protocol. Accordingly, network chips, connectors, and cables have been defined to provide a fixed number of lanes for a network port. Ethernet standards have been emerging where a port of a network chip may be configured to be a 4-lane port (e.g., 4×25G for 100 GbE), a 2-lane port (e.g., 2×25G for 50 GbE), or a 1-lane port (e.g., 1×25G for 25 GbE).

Existing connectors and cables for network ports are defined for a fixed number of lanes. This is not a problem for 1-lane ports or for multi-lane ports as long as the application calls for fixed lane-count ports (e.g., QSFP for a 4-lane port). When a multi-lane port of a chip in a network switch system, however, needs to be connected by network interface chips in computer systems having a varying number of lanes (e.g., 1-lane, 2-lane, 4-lane), the fixed lane-count connectors and cables will force certain lanes on a network chip port to be unusable, thus resulting in wasted or stranded lanes. A network chip may be a switch ASIC, a NIC (network interface controller) chip, an electrical transceiver chip (e.g., retimer, redriver), an optical transceiver chip, or a combination of these chips interconnected.

To minimize product models, many switches include QSFP ports. Using only one lane or two lanes out of the available four lanes, however, is wasteful. Therefore, users may buy switches with QSFP 4-lane ports for future proofing, and use break-out cables to fan-out four SFP 1-lane ports for every QSFP port. This approach is expensive and can introduce signal integrity issues. A fan-out cable may also be difficult to provide appropriate cable lengths, resulting installations with coiled up cables. The cable fan-out joint as well as cable coils can significantly introduce cable bulk that can impede air flow behind datacenter equipment racks.

Accordingly, this disclosure describes cable connectors to allow receptacles on the system side to accept a plurality of 1-lane cable assemblies so that switch manufacturers can design one system with one set of connectors on each faceplate that will allow varying lane-count cable assemblies by conjoining the plurality of 1-lane cable assemblies. Switch port signals may be connected to specific receptacle connector bays in a way that all the lanes of the network chips can be used. Therefore, the disclosure provides for high connector density and lower solution costs by enabling simple and compact connector designs. As will be further described, cable connectors of 1-lane cable assemblies may be conjoined to form multi-lane connectors and/or cable assemblies (e.g., 2-lane or 4-lane). Similarly, when it is desirable, the conjoined cable assemblies may be easily disjoined to be used as separate 1-lane cable assemblies.

Each network port connection is provided on a switch in the form of a receptacle for an external cable to be connected. Although the receptacles may be implemented on the front or the rear side of a switch, this disclosure uses the term "faceplate" to generically describe where the receptacles are located for cables to be installed.

As will be further described, surfaces of the cable connector of a 1-lane cable assembly may include features to conjoin or couple with corresponding features on surfaces of cable connectors or other 1-lane cable assemblies to form various multi-lane cable assemblies. In addition, the conjoined features may secure the 1-lane cable assemblies to each other. The features may be integrated on the shell or exterior of the cable connectors. As an example, the features described herein may be attached or detached from the surfaces of the cable connectors. By having feature that are attachable to the surfaces of the cable connectors, non-conjoined cable connectors (e.g., sides of cable connectors that do not need to be conjoined with other cable connectors) may not have the protruding coupling features. As a result, the non-conjoined connectors may be installed closer together on a faceplate, allowing for a higher connector density.

Figure 1B:
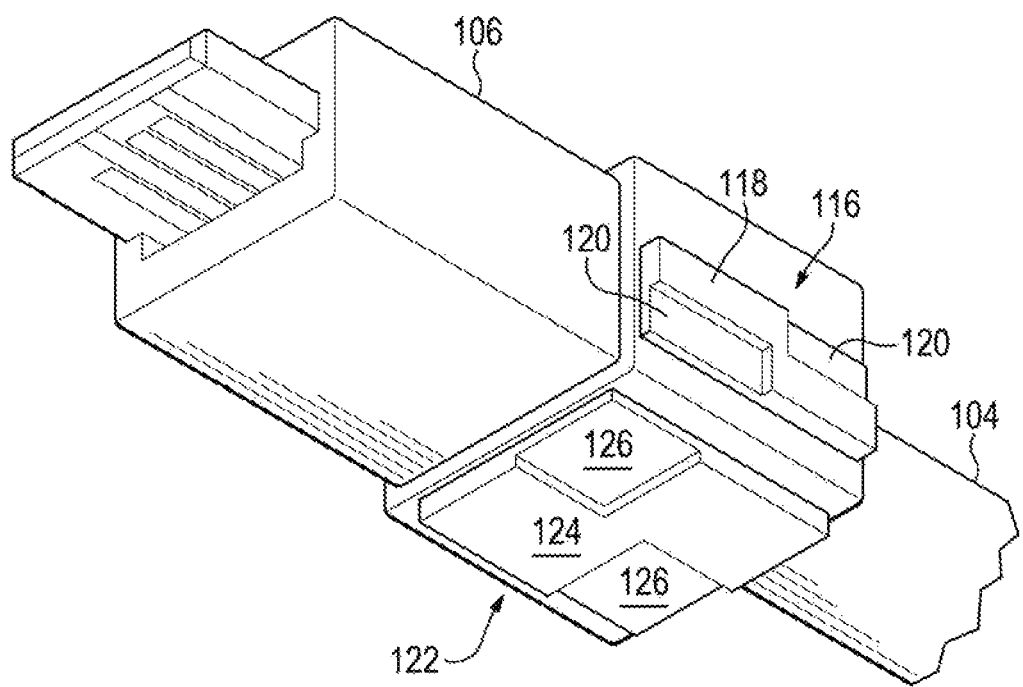
Figure 1C:
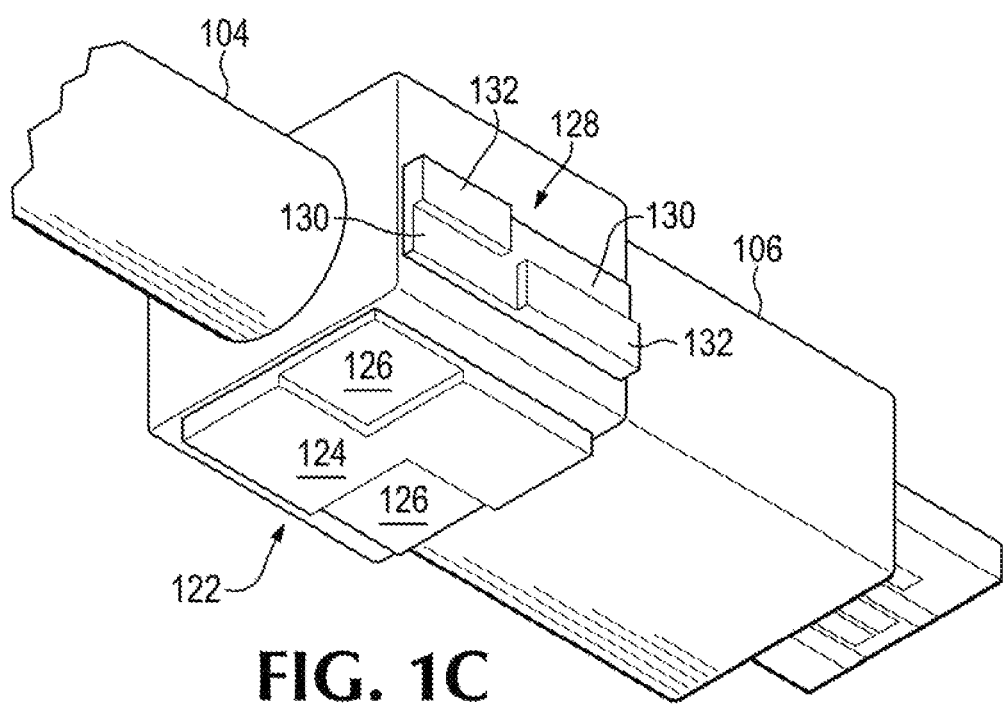

Referring to the figures, FIGS. 1A-C illustrate various isometric views of a cable connector 106 of a 1-lane cable assembly, according to an example. As an example, each 1-lane cable assembly includes a cable 104 and the cable connector 106 attached to at least one end of the cable 104. The features for conjoining the cable connector 106 with other cable connectors may include magnetically attractive tabs and recesses on the shell of the cable connectors. As an example, tabs of a first cable connector may magnetically couple with recesses of a second cable connector, and recesses of the first cable connector may magnetically couple with tabs of the second cable connector. The magnetically attractive force generated when the tabs and recesses of the first and second cable connectors are magnetically coupled to each other may secure the first and second cable connectors to each other until an opposing force sufficient to overcome magnetically attractive force is applied (e.g., pulling the cable connectors apart to overcome the magnetically attractive force).

Referring to FIG. 1A, a top surface of the cable connector 106 may include a feature 108 including magnetically attractive tabs 112 and recesses 110, and a side surface of the cable connector 106 may include a feature 116 including magnetically attractive tabs 118 and recesses 120. Referring to FIG. 1B, a bottom surface of the cable connector may include a feature 122 including magnetically attractive tabs 124 and recesses 126. Finally, referring to FIG. 10, a side surface of the cable connector opposite from feature 116 may include a feature 128 including magnetically attractive tabs 132 and recesses 130. The arrangement of the recesses and tabs on the connector cable 106 may vary, and are not limited to what is illustrated. In addition, the features 108, 116, 122, 128 may be attached or detached from the surfaces of the cable connectors 106, as described above.

Figure 2:
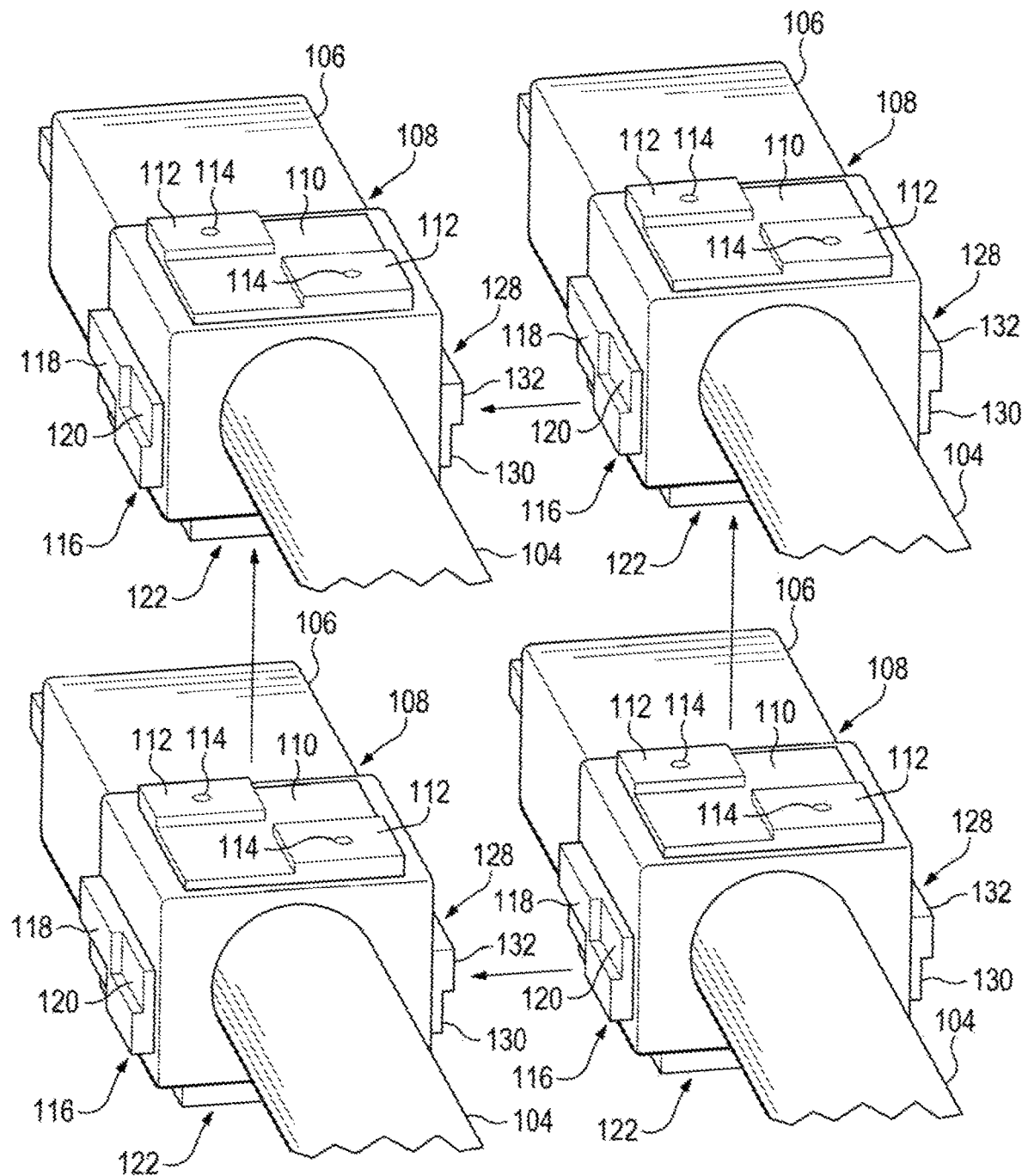
FIG. 2 illustrates cable connectors of four 1-lane cable assemblies with magnetically coupled features to form a 4-lane cable assembly, according to an example.

FIG. 2 illustrates cable connectors of four 1-lane cable assemblies magnetically coupled to form a 4-lane cable assembly, according to an example. As an example, the feature 122 on the bottom surface of the top two cable connectors 106 may magnetically couple with a reverse geometry of feature 108 on the top surface of bottom two cable connectors 106. More specifically, tabs 124 and recesses 126 on the bottom surface (not fully visible) of the top two cable connectors 106 may magnetically couple with the recesses 110 and tabs 112 on the top surface of the bottom two cable connectors 106, respectively. Similarly, feature 116 on a side surface of the right two cable connectors 106 may magnetically couple with a reverse geometry of feature 128 on a side of the left two cable connectors 106. More specifically, tabs 118 and recesses 120 on the side surface of the right two cable connectors 106 may magnetically couple with recesses 130 and tabs 132 on the side surface of the left two cable connectors 106, respectively.

Upon using features 108, 116, 122, 128 to conjoin or magnetically couple cable connectors 106 of 1-lane cable assemblies, the features may secure the 1-lane cable assemblies to each other until an opposing force sufficient to overcome the magnetically attractive force is applied. Although FIG. 2 illustrates the use of 1-lane cable assemblies to form a 4-lane cable assembly, other multi-lane cables may be formed by the 1-lane cable assemblies (e.g., a 2-lane or 8-lane cable assembly). However, if only the 4-lane cable assembly is desired, the features 108, 116, 122, 128 on the outside surfaces of the 4-lane cable assembly may be detached, allowing for higher connector density.

Each network port connection is provided on a network switch module in the form of a receptacle for an external cable assembly to be connected. As an example, receptacles on the system side may be configured to accept multi-lane cable assemblies, which include a plurality of conjoined 1-lane cable assemblies. The multiple receptacles to accept the plurality of conjoined 1-lane cable assemblies may be referred to as a single receptacle. As an example, the multi-lane cable assembly may include latching features for coupling the multi-lane cable assembly to the receptacle. For example, referring to the conjoined cable connectors of the multi-lane cable assembly, the latching features may be attachable to the surfaces of the conjoined connectors.

Figure 3:
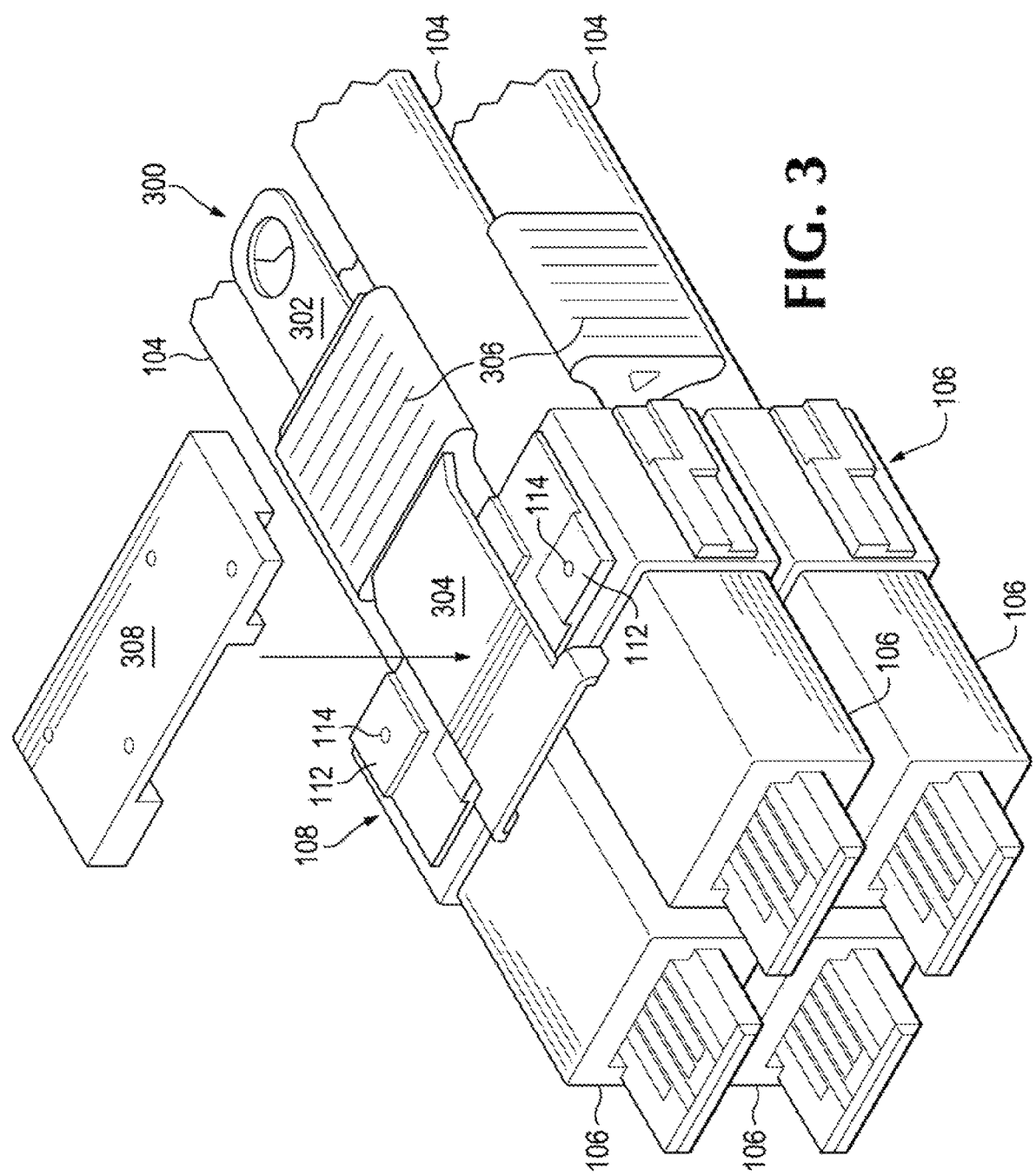
FIG. 3 illustrates an example of a cable joining device with a latching feature on magnetically coupled connectors to conjoin cables of four 1-lane cable assemblies.

In addition to conjoining cable connectors of 1-lane cable assemblies, the multi-lane cable assembly may include cable joining devices to conjoin the multiple cables of the multi-lane cable assembly. FIG. 3 illustrates a 4-way circlip (c-clip) cluster 300 as an example of a cable joining device to conjoin four cables 104 of 1-lane cable assemblies. As illustrated, the cable connectors 106 of the four 1-lane cable assemblies may conjoined with each other via the magnetic coupling described above. However, the cable connectors 106 may also be conjoined with each other in other manners, as will be further described.

As illustrated, the c-clip cluster 300 may include an integrated latching feature 304 for coupling the multi-lane cable assembly to a receptacle, according to an example. As an example, as multiple cable joining devices may be used, the c-clip cluster 300 with the integrated latching feature 304 may be coupled to an end of the cables of the multi-lane cable assembly, adjacent to cable connectors 106 for making connection with the receptacle. As an example, the multi-lane cable assembly may include a latch holding plate 308 for securing the latching features 304 to the multi-lane cable assembly. The tabs 112 on the top surfaces of the cable connectors 106 may include holes 114 for accommodating the holding plate 308.

For removing or disengaging the multi-lane cable assembly from the receptacle, the c-clip cluster 300 may include pull-tabs 302 (e.g., one or more) to actuate the latching features 304 to disengage from the receptacle. As an example, outer surfaces of the c-clip cluster 300 may be textured (indicated by 306) for ease of operation to actuate the latching feature 304, particularly when pull-tabs 304 may not be available. The c-clip cluster 300 may have enough tolerance in order to slide along the conjoined cables 104, so that the latching feature 304 can be actuated easily when the pull-tabs 302 or the c-clip cluster 300 itself is pulled back to unlatch the cable assembly from the receptacle.

As an example, the features for conjoining the cable connector 106 with other cable connectors may include flanges on the surface or shell of the cable connectors and corresponding holes on the shell of other cable connectors for accommodating the flanges, as will be illustrated in the following figures. As mentioned above, the features, including the flanges, may be attached or detached from the surfaces of the cable connectors 106. By having flanges that are attachable to the surfaces of the cable connectors, non-conjoined cable connectors (e.g., sides of cable connectors that do not need to be conjoined with other cable connectors) may not have the protruding coupling flanges. As a result, the non-conjoined connectors may be installed closer together on a faceplate, allowing for a higher connector density.

FIGS. 4A-D illustrate various views of a cable connector 106 of a 1-lane cable assembly, according to an example.

Figure 4A:
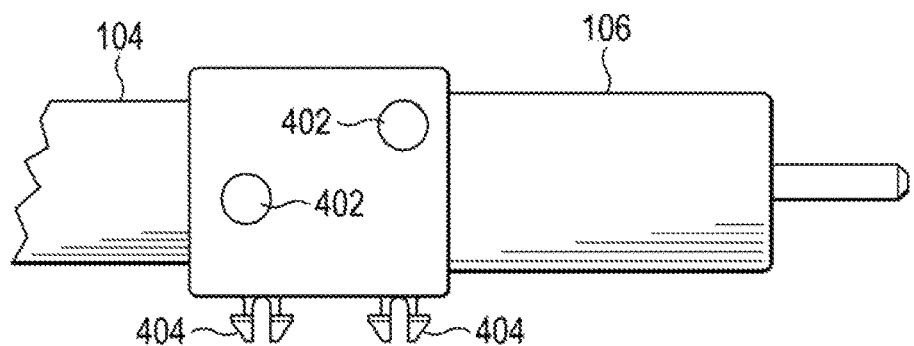
FIGS. 4A-D illustrate various views of a compression-fit cable connector of a 1-lane cable assembly, according to an example.
Figure 4B:
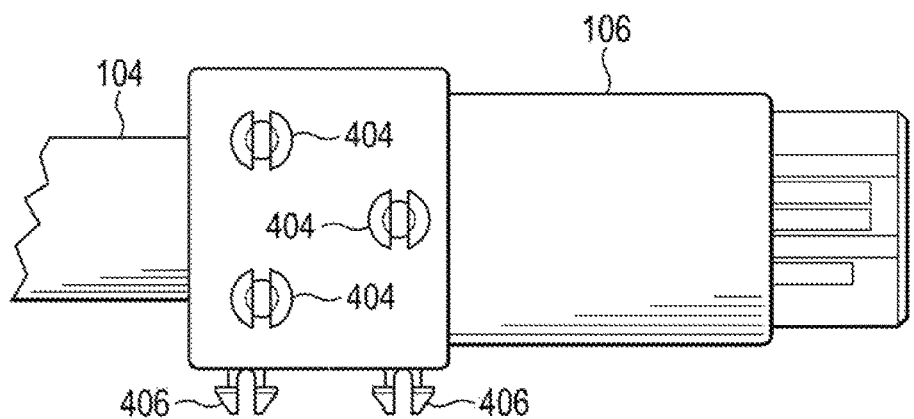
Figure 4C:
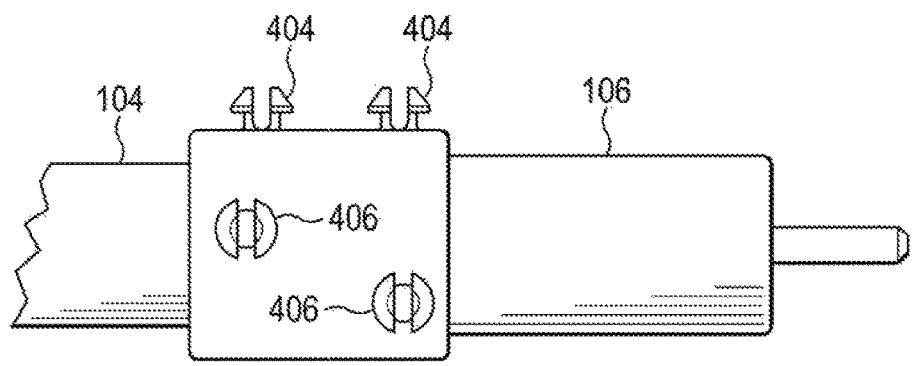
Figure 4D:
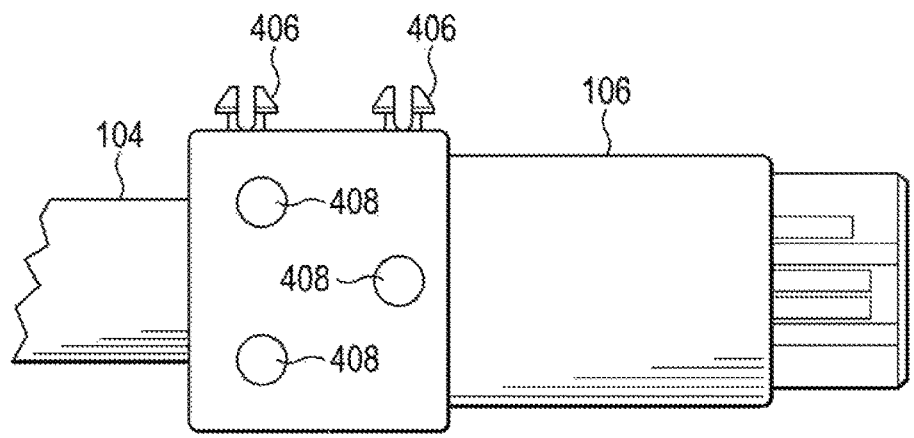

More specifically, FIG. 4A illustrates a right side surface of the cable connector 106, FIG. 4B illustrates a top surface, FIG. 4C illustrates a left side surface, and FIG. 4D illustrates a bottom surface. The features for conjoining the cable connector 106 with other cable connectors may include flanges and holes incorporating compression-fit coupling surfaces. As an example, when the flanges on the surface of a first cable connector 106 are to conjoin with corresponding holes on the surface of a second cable connector 106, the flanges may compress in order to fit within the holes. Upon conjoining the flanges with the corresponding holes, the flanges may expand in order to secure the cable connectors of the 1-lane cables assemblies to each other. As an example, in order to disjoin the cable connectors of the 1-lane cable assemblies apart from each other, an opposing force sufficient to compress the flanges in order to exit the holes may be applied (e.g., pulling the cable connectors apart until the flanges compress).

As illustrated, the top surface of a first cable connector 106 (FIG. 4B) includes three flanges 404 for fitting within the three corresponding holes 408 on the bottom surface of a second cable connector 106 (FIG. 4D). Similarly, the left side surface of a first cable connector (FIG. 4C) includes two flanges 406 for fitting within the two corresponding holes 402 on the right side surface of a second cable connector (FIG. 4A). As described above, the flanges may compress when inserting them into the corresponding holes, and the flanges may then expand in order to secure the cable connectors to each other. The number and arrangement of the flanges and holes on the connector cable 106 may vary, and are not limited to what is illustrated. As an example, the flanges 404, 406 may be attached to or detached from their corresponding attachment holes, e.g., by means of employing screw threads on the base of the flanges (not shown).

Figure 5:
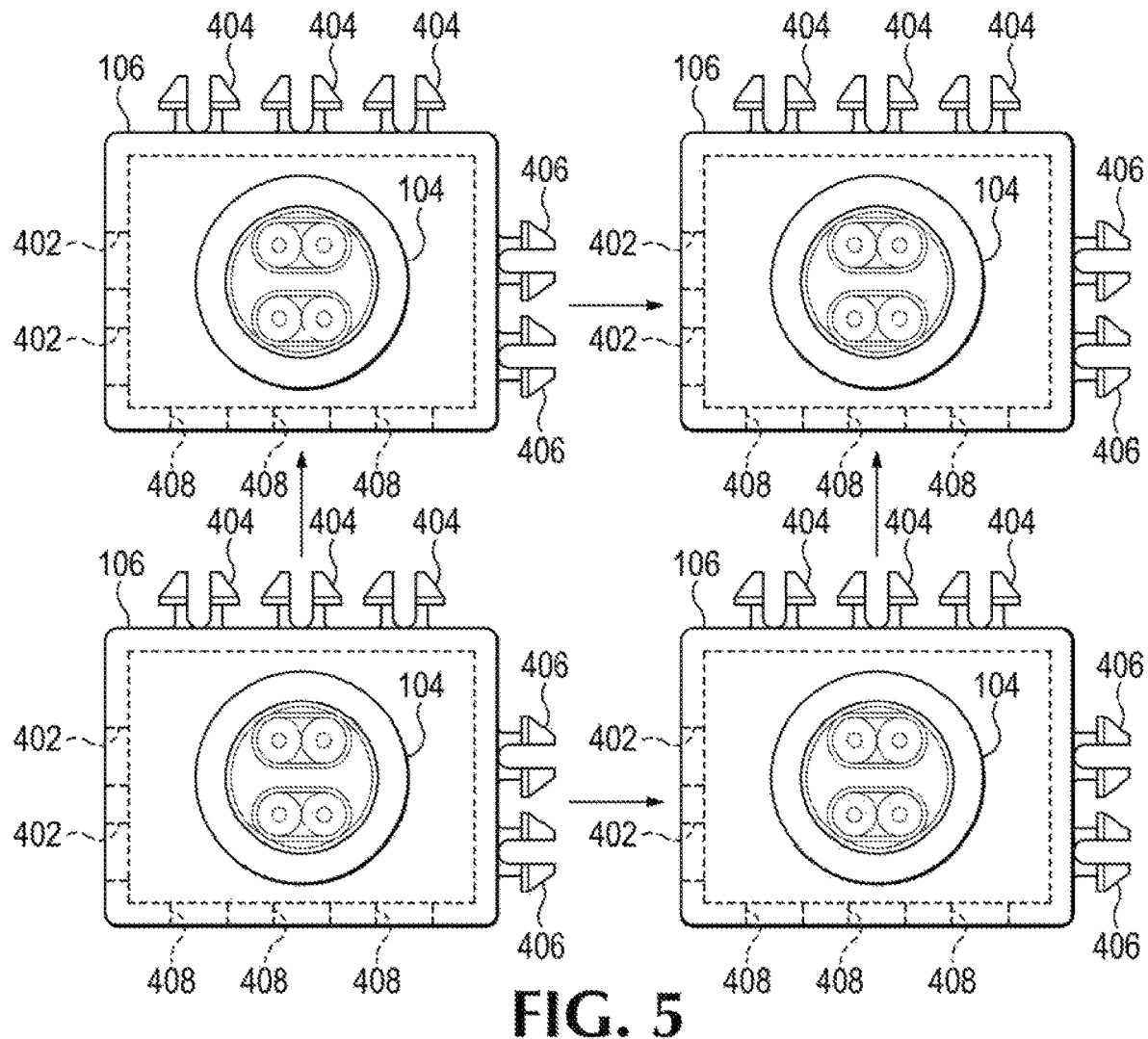
FIG. 5 illustrates cable connectors of four 1-lane cable assemblies having compression-fit coupling surfaces to conjoin with each other, according to an example.

FIG. 5 illustrates the rear view of cable connectors of four 1-lane cable assemblies having compression-fit coupling surfaces to conjoin with each other and form a 4-lane cable assembly, according to an example. The flanges 404 on the top surface of the bottom two cable connectors 106 may conjoin with the corresponding holes 408 on the bottom surface of the top two cable connectors 106. Similarly, the flanges 406 on a side surface of the left two cable connectors 106 may conjoin with the corresponding holes 402 on a side surface of the right two cable connectors 106.

Upon conjoining the flanges with the corresponding holes, the flanges may expand within the holes in order to secure the cable connectors 106 of the four 1-lane cable assemblies to each other. As an example, the walls of the holes may have textured patterns for the flanges' expansion force to secure themselves within the holes. Once secured with each other, the 1-lane cable assemblies may be disjoined by applying an opposing force that is sufficient to compress the flanges so that the flanges can exit from the corresponding holes. In another example, flanges and holes may be designed to permanently conjoin coupled connectors. Although FIG. 5 illustrates the use of 1-lane cable assemblies to form a 4-lane cable assembly, other multi-lane cables may be formed by the 1-lane cable assemblies (e.g., a 2-lane or 8-lane cable assembly). However, if only the 4-lane cable assembly is desired, the flanges 404, 406 on the outside surfaces of the 4-lane cable assembly may be detached, allowing for higher connector density.

Figure 6A:
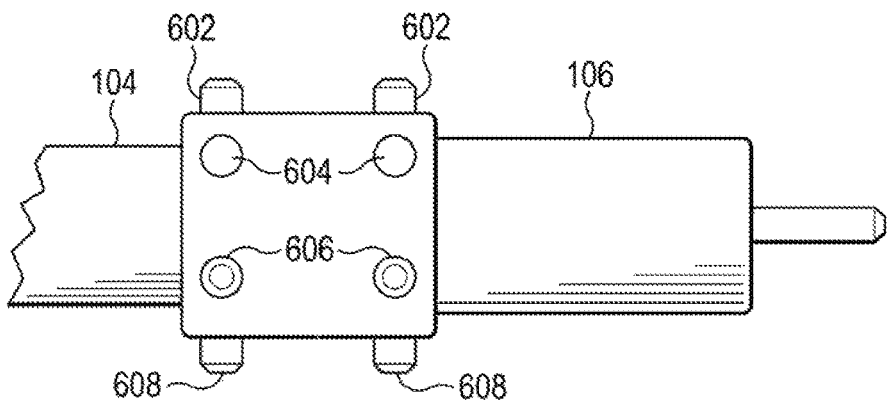
FIGS. 6A-D illustrate various views of an interference-fit cable connector of a 1-lane cable assembly, according to an example.
Figure 6B:
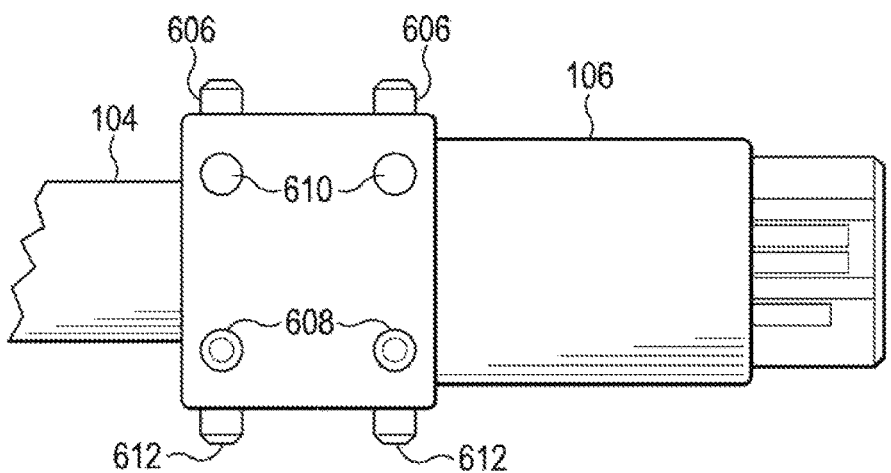
Figure 6C:
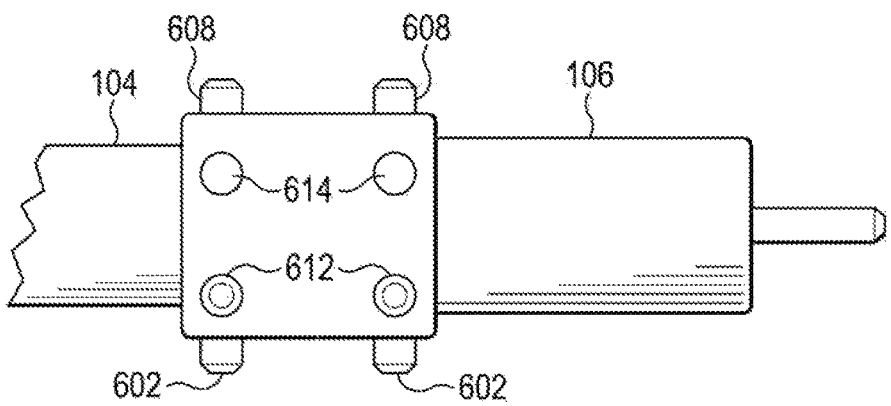
Figure 6D:
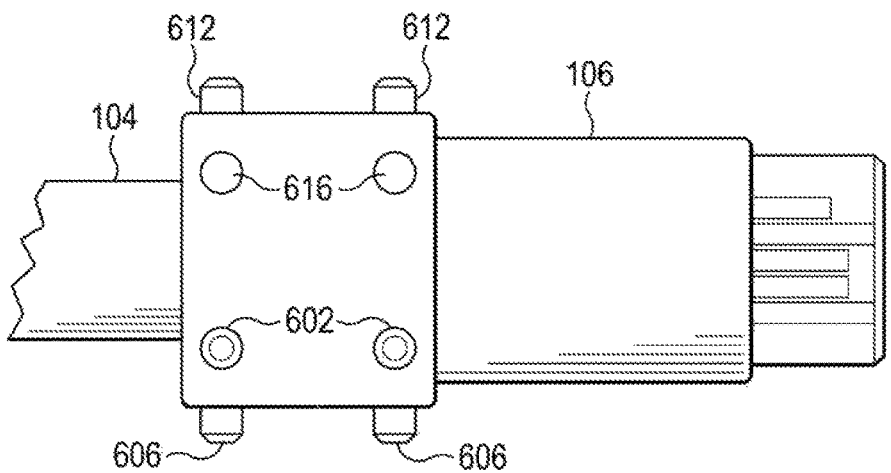

FIGS. 6A-D illustrate various views of a cable connector 106 of a 1-lane cable assembly, according to an example. More specifically, FIG. 6A illustrates a right side surface of the cable connector 106, FIG. 6B illustrates a top surface, FIG. 6C illustrates a left side surface, and FIG. 6D illustrates a bottom surface. The features for conjoining the cable connector 106 with other cable connectors may include flanges and holes incorporating interference-fit coupling surfaces. As an example, the holes for accommodating the flanges may be sized slightly smaller than the flange (e.g., by 0.1 mm), in order for the flanges to be fitted with mechanical interference.

Alternatively, the holes and the flanges may be rib-shaped or textured, as an example. As a result, upon conjoining the flanges on the surface of a cable connector of a first 1-lane cable assembly with the corresponding holes on the surface of a cable connector of a second 1-lane cable assembly, the rib-shaped or textured material may secure the 1-lane cable assemblies to each other. As an example, in order to disjoin the cable connectors of the 1-lane cable assemblies apart from each other, an opposing force sufficient to overcome the mechanical interference may be applied (e.g., pulling the cable connectors apart until the mechanical interference is overcome).

As illustrated, the top surface of a first cable connector 106 (FIG. 6B) includes flanges 608 and holes 610 for fitting within the corresponding holes 616 and flanges 602 on the bottom surface of a second cable connector 106 (FIG. 6D). Similarly, the left side surface of a first cable connector (FIG. 6C) includes flanges 612 and holes 614 for fitting within the corresponding holes 604 and flanges 606 on the right side surface of a second cable connector (FIG. 6A). As described above, as the flanges may be fitted within the corresponding holes with mechanical interferences, the flanges may remain secured within the corresponding holes. The number and arrangement of the flanges and holes on the connector cable 106 may vary, and are not limited to what is illustrated.

Figure 7:
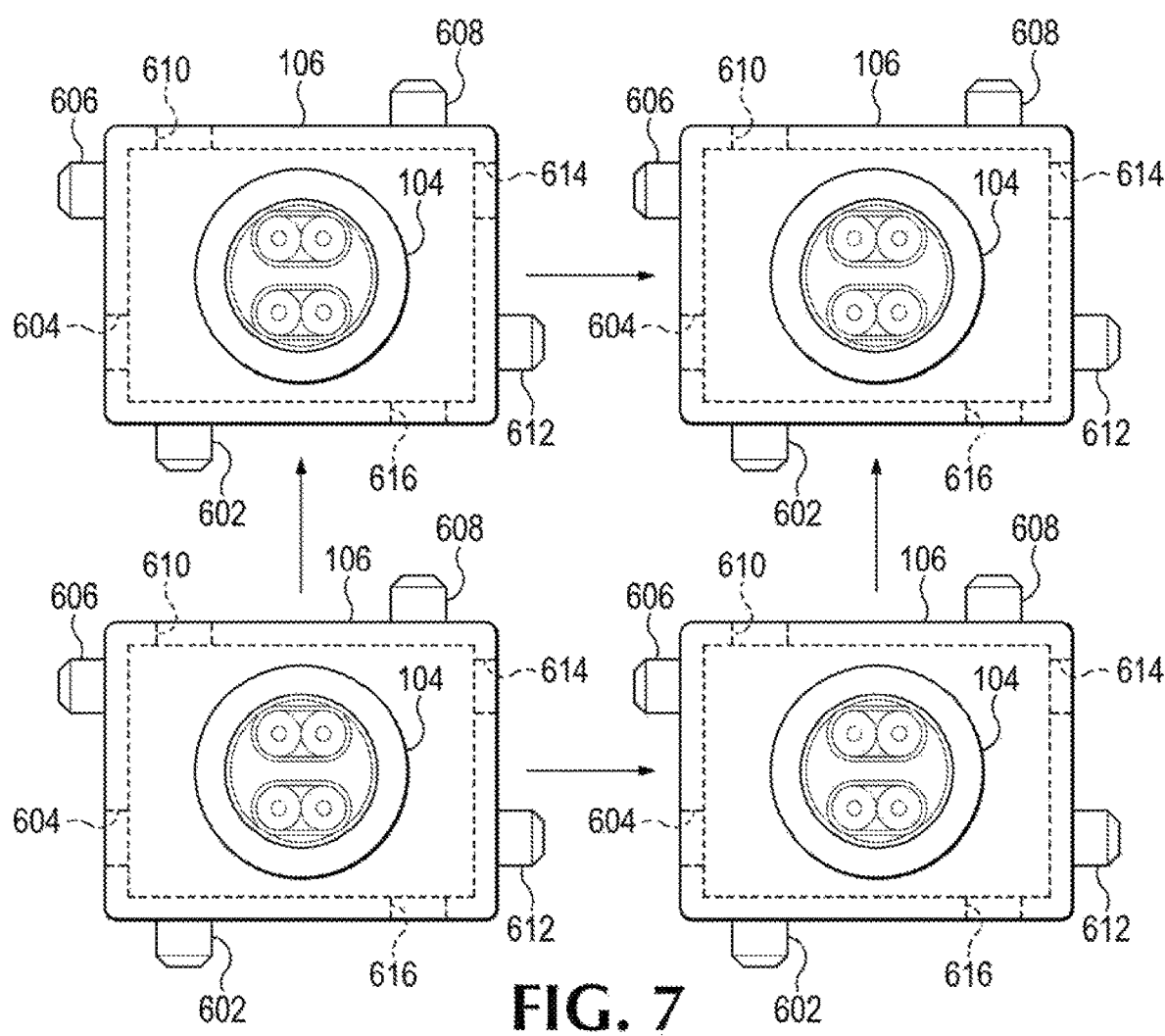
FIG. 7 illustrates cable connectors of four 1-lane cable assemblies having interference-fit coupling surfaces to conjoin with each other, according to an example.

FIG. 7 illustrates the rear view of cable connectors of four 1-lane cable assemblies having interference-fit coupling surfaces to conjoin with each other and form a 4-lane cable assembly, according to an example. The flanges 608 on the top surface of the bottom two cable connectors 106 may conjoin with the corresponding holes 616 on the bottom surface of the top two cable connectors 106. Similarly, the flanges 602 on the bottom surface of the top two cable connectors 106 may conjoin with the corresponding holes 610 on the top surface of the bottom two cable connectors 106. In addition, the flanges 612 on a side surface of the left two cable connectors 106 may conjoin with the corresponding holes 604 on a side surface of the right two cable connectors 106. Similarly, the flanges 606 on the side surface of the right two cable connectors may conjoin with the corresponding holes 614 on the side surface of the left two cable connectors 106.

Upon conjoining the flanges with the corresponding holes, the flanges may remain within the holes (e.g., due to mechanical interference) in order to secure the cable connectors 106 of the four 1-lane cable assemblies to each other. Once secured with each other, the 1-lane cable assemblies may be disjoined by applying an opposing force that is sufficient to overcome the mechanical interference. Although FIG. 7 illustrates the use of 1-lane cable assemblies to form a 4-lane cable assembly, other multi-lane cables may be formed by the 1-lane cable assemblies (e.g., a 2-lane or 8-lane cable assembly). However, if only the 4-lane cable assembly is desired, the flanges 602, 606, 608, 612 on the outside surfaces of the 4-lane cable assembly may be detached, allowing for higher connector density. As an example, the flanges 602, 606, 608, 612 may be attached to or detached from their corresponding attachment holes, e.g., by means of employing screw threads on the base of the flanges (not shown).

Figure 8A:
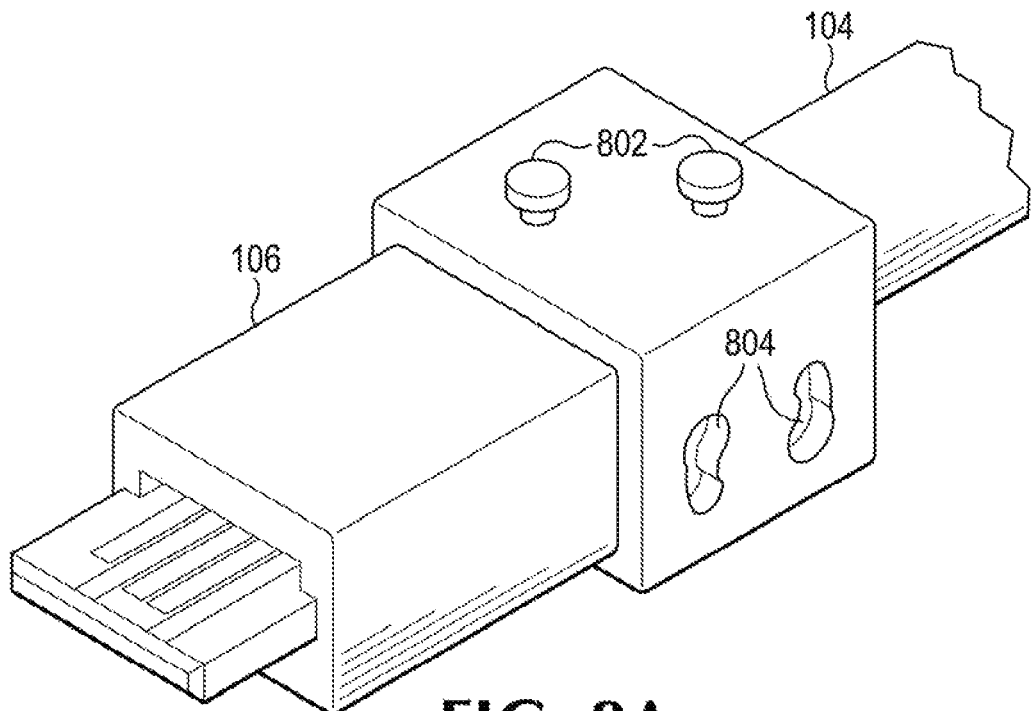
FIGS. 8A-C illustrate various isometric views of twist-locked cable connectors of 1-lane cable assemblies, according to an example.
Figure 8B:
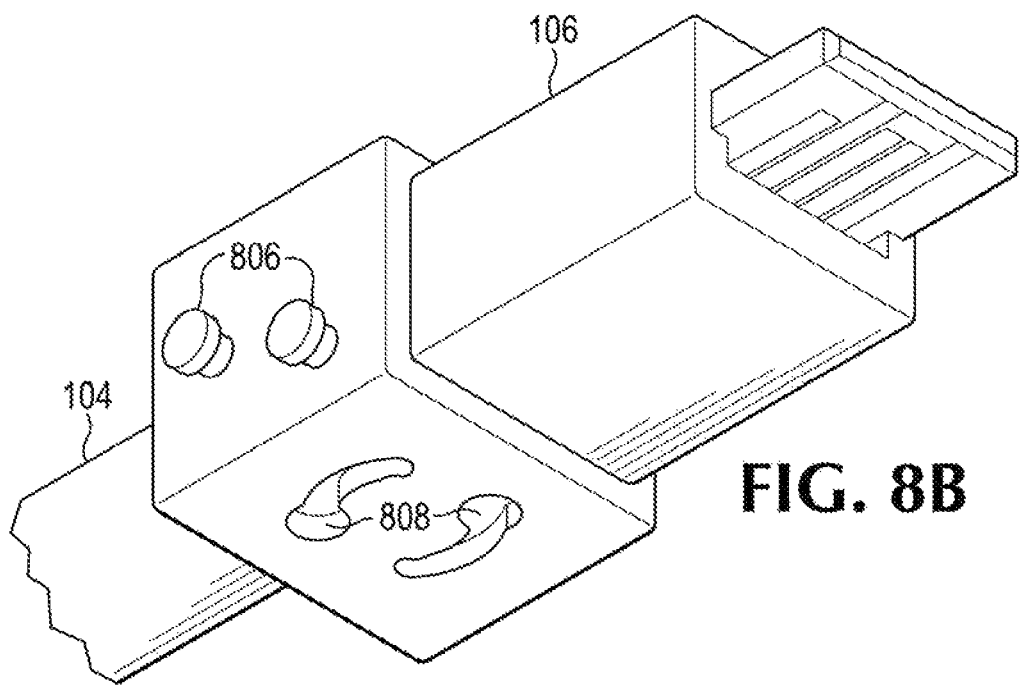

FIGS. 8A-B illustrate various isometric views of a cable connector 106 of a 1-lane cable assembly, according to an example. The features for conjoining the cable connector 106 with other cable connectors may include twist-lock coupling surfaces. As an example, a side surface of a first cable connector (FIG. 8B) includes two flanges 806 for fitting within two corresponding receptacles or holes 804 on an opposing side surface of a second cable connector (FIG. 8A).

Figure 8C:
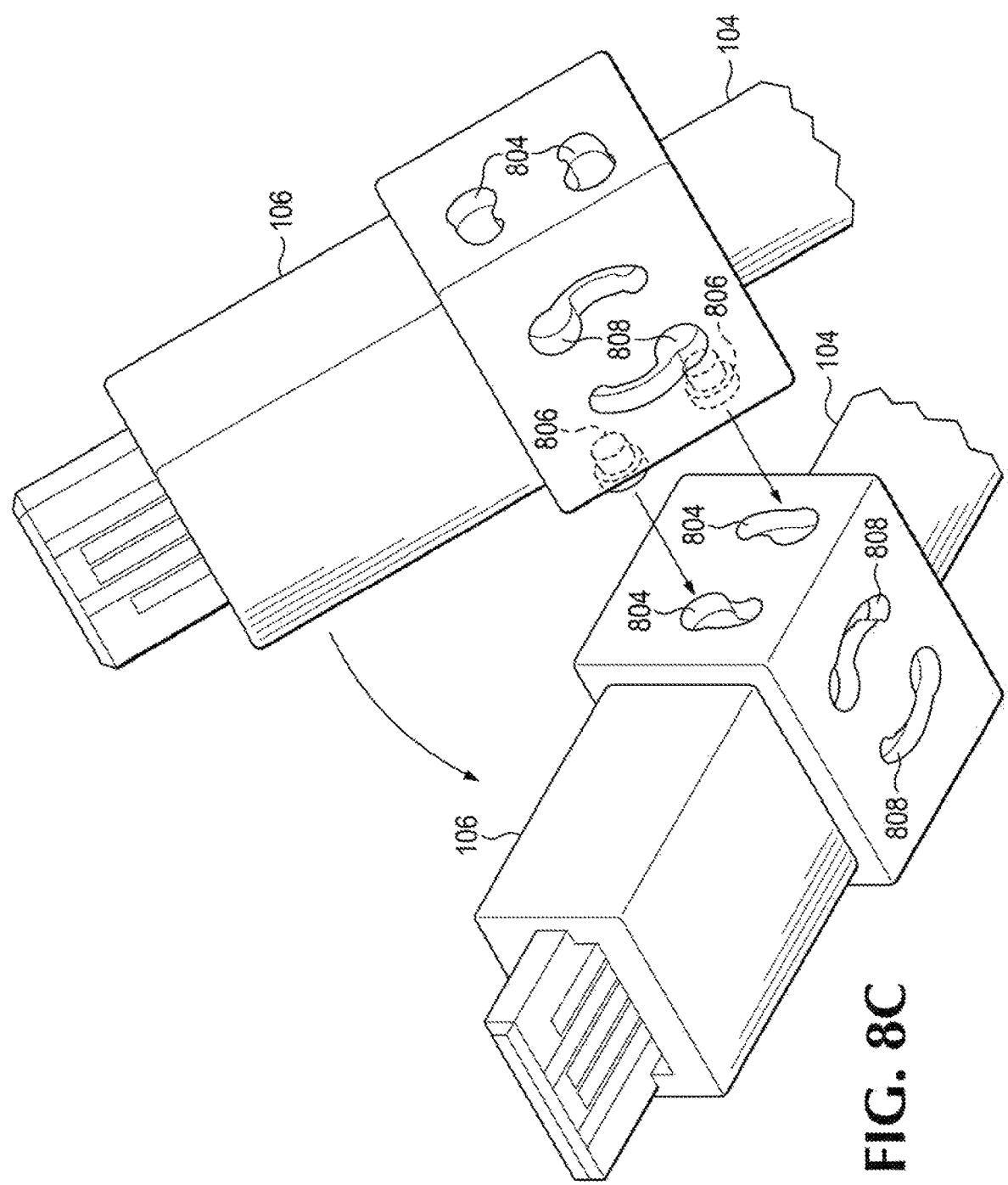

Referring to FIG. 8C, the flanges 806 of the first cable connector 106 may be inserted into the holes 804 of the second cable connector 106 at an offset. In order to secure the first and second cable connectors to each other, the cable connectors may be twisted so that the flanges 806 may follow the curve of the holes 804 and lock in place. In order to disjoin the cable connectors, they may be twisted in the opposite direction, and then the flanges 806 may be extracted from the holes 804. Similar to the flanges 806 and holes 804 on the side surfaces of the cable connectors 106, a top surface of a first cable connector includes two flanges 802 for fitting within two corresponding receptacles or holes 808 on a bottom surface of a second cable connector. Similar to examples described above, various multi-lane cables may be formed by using 1-lane cable assemblies with the twist-lock coupling surfaces.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A cable assembly comprising:
a plurality of 1-lane cable assemblies, each 1-lane cable assembly comprising:
a cable; and
a cable connector attached to at least one end of the cable, wherein each surface of each cable connector of each 1-lane cable assembly comprise features to conjoin with corresponding features on surfaces of cable connectors of other 1-lane cable assemblies, wherein the conjoined features secure the 1-lane cable assemblies to each other to form a multi-lane cable assembly; and
latching features to couple the cable assembly to a receptacle.

2. The cable assembly of claim 1, wherein the features on the surfaces of a cable connector comprise magnetically attractive tabs and recesses, wherein tabs of a first cable connector are to magnetically couple with recesses of a second cable connector, and wherein recesses of the first cable connector are to magnetically couple with tabs of the second cable connector.

3. The cable assembly of claim 2, wherein a magnetically attractive force generated when the tabs and recesses of the first and second cable connectors are to be magnetically coupled to each other is to secure the first and second cable connectors to each other until an opposing force sufficient to overcome the magnetically attractive force is to be applied.

4. The cable assembly of claim 1, wherein the conjoined features secure the 1-lane cable assemblies via twist-locking connectors.

5. The cable assembly of claim 1, wherein the features on the surfaces of the cable connector of the 1-lane cable assembly comprise flanges, and wherein the corresponding features on the surfaces of the cable connectors of the other 1-lane cable assemblies comprise holes for accommodating the flanges.

6. The cable assembly of claim 5, wherein the flanges are attachable to or detachable from attachment holes on the surfaces of the cable connector.

7. The cable assembly of claim 5, wherein when the flanges are to conjoin with the corresponding holes, the flanges are to compress in order to fit within the holes.

8. The cable assembly of claim 5, wherein the holes for accommodating the flanges are sized for the flanges to be fitted with mechanical interference.

9. The cable assembly of claim 1, wherein the latching features are attachable to surfaces of conjoined cable connectors of the cable assembly.

10. The cable assembly of claim 1, wherein the latching feature are secured to the cable assembly via a latch holding plate.

11. The cable assembly of claim 10, wherein the latch holding plate attaches to conjoining features of a cable of the cable assembly which the latching feature is coupled to.

12. A cable assembly comprising:
a plurality of 1-lane cable assemblies, each 1-lane cable assembly comprising:
a cable; and
a cable connector attached to at least one end of the cable, wherein a top surface, bottom surface, and two side surfaces of each cable connector of a 1-lane cable assembly comprise features to conjoin with corresponding features on surfaces of cable connectors of other 1-lane cable assemblies,
wherein the features comprise flanges and the corresponding features comprise holes for accommodating the flanges, wherein the conjoined features secure the 1-lane cable assemblies to each other to form a multi-lane cable assembly; and
latching features to couple the cable assembly to a receptacle.

13. The cable assembly of claim 12, wherein when the flanges are to conjoin with the corresponding holes, the flanges are to compress in order to fit within the holes.

14. The cable assembly of claim 13, wherein upon conjoining the flanges with the corresponding holes, the flanges are to expand in order to secure the 1-lane cable assemblies to each other.

15. The cable assembly of claim 12, wherein the holes for accommodating the flanges are sized for the flanges to be fitted with mechanical interference.

16. The cable assembly of claim 12, wherein the flanges and corresponding holes are rib-shaped or textured, and wherein upon conjoining the flanges with the corresponding holes, the rib-shaped or textured material are to secure the 1-lane cable assemblies to each other.

17. The cable assembly of claim 12, wherein the flanges on the surfaces of the cable connector of the 1-lane cable assembly are attachable.

* * * * *